US008955811B2

(12) United States Patent
Colman et al.

(10) Patent No.: US 8,955,811 B2
(45) Date of Patent: Feb. 17, 2015

(54) EXTENDABLE/RETRACTABLE SUPPORT COLUMN

(71) Applicants: Mark Colman, Hudson, WI (US); John Norris, Columbia Heights, MN (US)

(72) Inventors: Mark Colman, Hudson, WI (US); John Norris, Columbia Heights, MN (US)

(73) Assignee: Tower Solutions, LLC, Eden Prairie, MN (US)

( * ) Notice: Subject to any disclaimer, the term of this patent is extended or adjusted under 35 U.S.C. 154(b) by 0 days.

(21) Appl. No.: 13/758,482

(22) Filed: Feb. 4, 2013

(65) Prior Publication Data

US 2013/0153733 A1  Jun. 20, 2013

Related U.S. Application Data

(63) Continuation of application No. 12/537,948, filed on Aug. 7, 2009, now Pat. No. 8,366,066, which is a continuation of application No. 12/033,225, filed on Feb. 19, 2008, now abandoned, which is a continuation of application No. 10/826,867, filed on Apr. 16, 2004, now Pat. No. 7,357,365.

(60) Provisional application No. 60/463,480, filed on Apr. 17, 2003.

(51) Int. Cl.
A47F 5/00 (2006.01)
A47H 1/10 (2006.01)

(52) U.S. Cl.
USPC ............ 248/300; 248/436; 248/440; 248/653

(58) Field of Classification Search
USPC .......................... 248/300; 198/778, 822, 852
See application file for complete search history.

(56) References Cited

U.S. PATENT DOCUMENTS

| 999,126 | A | 7/1911 | Sistermann |
|---|---|---|---|
| 1,054,737 | A | 3/1913 | Woodbury |
| 2,269,363 | A | 1/1942 | Farrand |
| 2,357,165 | A | 8/1944 | Brady |
| 2,375,461 | A | 5/1945 | Bender |
| 2,375,462 | A | 5/1945 | Bender |
| 2,481,471 | A | 9/1949 | Crot |
| 2,620,904 | A | 12/1952 | Le Roy |
| 2,643,745 | A | 6/1953 | Olszewski |

(Continued)

FOREIGN PATENT DOCUMENTS

| EP | 0 399 215 | 11/1990 |
|---|---|---|
| FR | 2587399 | 3/1987 |
| GB | 2074981 | 11/1981 |

OTHER PUBLICATIONS

International Search Report and Written Opinion of International Application No. PCT/US2004/011763, filed Apr. 16, 2004, both mailed Aug. 24, 2006.

(Continued)

Primary Examiner — Amy J Sterling
(74) Attorney, Agent, or Firm — Moore & Hansen, PLLC

(57) ABSTRACT

An extendable and retractable column which is formed from at least three linked sections. The linked sections include a plurality of individual sections linked end to end. As the linked sections are extended, each of the individual sections of the linked chains engage individual sections of adjacent linked chains to form a column. As the linked sections are retracted, each of the individual sections of the linked chains disengage from the individual section of the adjacent linked sections and the individual linked sections may be rolled up for compact storage.

20 Claims, 19 Drawing Sheets

(56) References Cited

U.S. PATENT DOCUMENTS

| | | | |
|---|---|---|---|
| 2,661,082 | A | 12/1953 | Ziegler |
| 2,767,812 | A | 10/1956 | Boger |
| 2,794,612 | A | 6/1957 | Clifton |
| 2,795,303 | A | 6/1957 | Muehlhause et al. |
| 2,806,562 | A | 9/1957 | Harman |
| 2,844,232 | A | 7/1958 | Le Roy |
| 2,857,994 | A | 10/1958 | Sheard |
| 2,987,148 | A | 6/1961 | Millard |
| 3,000,473 | A | 9/1961 | Reynolds |
| 3,012,635 | A | 12/1961 | Blain |
| 3,016,988 | A | 1/1962 | Browning |
| 3,101,816 | A | 8/1963 | Fox |
| 3,203,657 | A | 8/1965 | Thompson |
| 3,204,721 | A | 9/1965 | Park |
| 3,213,573 | A | 10/1965 | Bohr |
| 3,233,722 | A * | 2/1966 | Jorgensen .................. 198/822 |
| 3,242,576 | A | 3/1966 | Wheeler |
| 3,328,921 | A | 7/1967 | Keslin |
| 3,354,596 | A | 11/1967 | Schafer |
| 3,385,397 | A | 5/1968 | Robinsky |
| 3,397,546 | A | 8/1968 | Eisert et al. |
| 3,486,279 | A | 12/1969 | Mauch |
| 3,672,104 | A | 6/1972 | Luckey |
| 3,684,056 | A | 8/1972 | Penso |
| 3,900,305 | A | 8/1975 | DeLuca |
| 3,934,741 | A | 1/1976 | Wentz |
| 4,003,296 | A | 1/1977 | Wentz |
| 4,024,595 | A | 5/1977 | Brown |
| 4,027,440 | A | 6/1977 | Hamblin |
| 4,089,147 | A | 5/1978 | Bain |
| 4,224,005 | A | 9/1980 | Dysarz |
| 4,235,345 | A | 11/1980 | VandeDrink et al. |
| 4,237,662 | A | 12/1980 | Kinzler |
| 4,337,845 | A | 7/1982 | Zelli et al. |
| 4,386,485 | A | 6/1983 | Kramer |
| 4,587,777 | A | 5/1986 | Vasques et al. |
| 4,651,480 | A | 3/1987 | Kramer |
| 4,785,576 | A | 11/1988 | Morgan |
| 4,829,739 | A | 5/1989 | Coppa |
| 4,830,337 | A | 5/1989 | Ichiro et al. |
| 4,850,161 | A | 7/1989 | McGinnis |
| 4,920,710 | A | 5/1990 | Paine |
| 4,984,133 | A | 1/1991 | Casanova et al. |
| 5,056,278 | A | 10/1991 | Atsukawa |
| 5,154,027 | A | 10/1992 | Warden |
| 5,184,444 | A | 2/1993 | Warden |
| 5,249,396 | A | 10/1993 | Zuse |
| 6,098,758 | A | 8/2000 | Gates |
| 6,112,474 | A | 9/2000 | Paine |
| 6,237,750 | B1 * | 5/2001 | Damkjaer et al. ............ 198/778 |
| 6,321,903 | B1 | 11/2001 | Shaffer |
| 7,310,915 | B2 | 12/2007 | Olsen |
| 7,357,365 | B2 | 4/2008 | Colman et al. |
| 7,581,360 | B2 | 9/2009 | Olsen |
| 7,621,078 | B2 | 11/2009 | Phelan et al. |
| 7,694,465 | B2 | 4/2010 | Pryor |
| 7,921,611 | B2 | 4/2011 | Olsen |
| 7,931,139 | B2 * | 4/2011 | Nielsen .................. 198/851 |
| 8,042,682 | B2 * | 10/2011 | Ertel .................. 198/834 |
| 8,225,559 | B2 | 7/2012 | Olsen |
| 2002/0129567 | A1 | 9/2002 | Olsen |
| 2003/0044744 | A1 | 3/2003 | Nava |
| 2004/0107671 | A1 | 6/2004 | McGinnis et al. |
| 2004/0194397 | A1 | 10/2004 | Brown et al. |
| 2005/0109908 | A1 | 5/2005 | Colman et al. |
| 2007/0051065 | A1 | 3/2007 | Olsen |
| 2008/0028715 | A1 | 2/2008 | Foss et al. |
| 2008/0196323 | A1 | 8/2008 | Colman et al. |
| 2009/0223139 | A1 | 9/2009 | Meiners |
| 2010/0038499 | A1 | 2/2010 | Colman et al. |
| 2010/0107516 | A1 | 5/2010 | Olsen |
| 2011/0185648 | A1 | 8/2011 | Olsen |
| 2012/0102850 | A1 | 5/2012 | Kensinger et al. |
| 2012/0279144 | A1 | 11/2012 | Olsen |

OTHER PUBLICATIONS

International Search Report and Written Opinion of International Application No. PCT/US2011/058041, filed Oct. 27, 2011, both mailed Mar. 7, 2012.

International Application No. PCT/US2001/029741, filed Sep. 21, 2001, International Search Report mailed Apr. 4, 2002 and International Preliminary Examination Report mailed May 23, 2003.

United States Patent and Trademark Office, Prosecution History of US Patent No. 7,310,915, issued Dec. 25, 2007, Retractable Column and Method of Forming, Olsen.

United States Patent and Trademark Office, Prosecution History of US Patent No. 7,357,365, issued Apr. 15, 2008, Extendable/Retractable Support Column, Colman, et al.

United States Patent and Trademark Office, Prosecution History of US Patent No. 7,581,360, issued Sep. 1, 2009, Retractable Column and Method of Forming, Olsen.

United States Patent and Trademark Office, Prosecution History of US Patent No. 7,921,611, issued Apr. 12, 2011, Retractable Column and Method of Forming, Olsen.

United States Patent and Trademark Office, Prosecution History of US Patent No. 8,225,559, issued Jul. 24, 2012, Retractable Column and Method of Forming, Olsen.

United States Patent and Trademark Office, Prosecution History of US Patent No. 8,366,066, issued Feb. 5, 2013, Extendable/Retractable Support Column, Colman, et al.

United States Patent and Trademark Office, Prosecution History through Feb. 4, 2013, of U.S. Appl. No. 13/553,409, filed Jul. 19, 2012, Retractable Column and Method of Forming, Olsen.

* cited by examiner

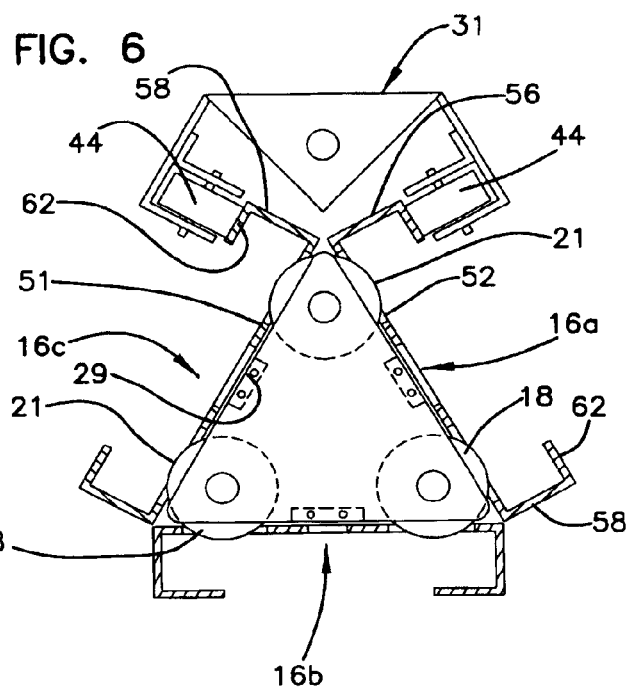
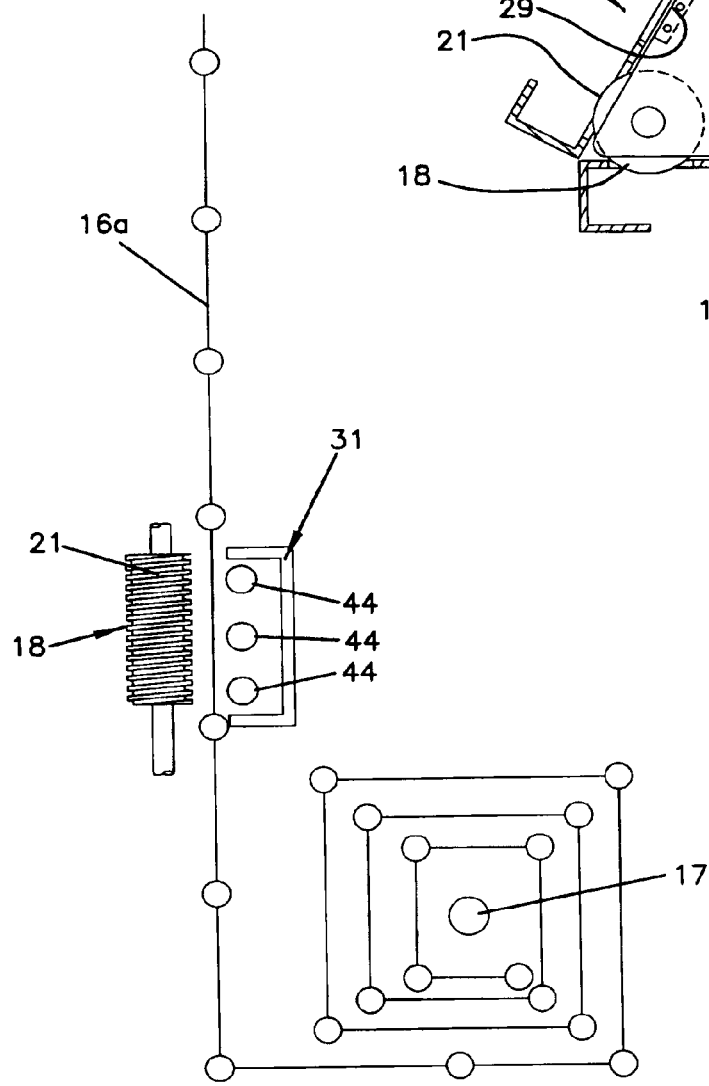

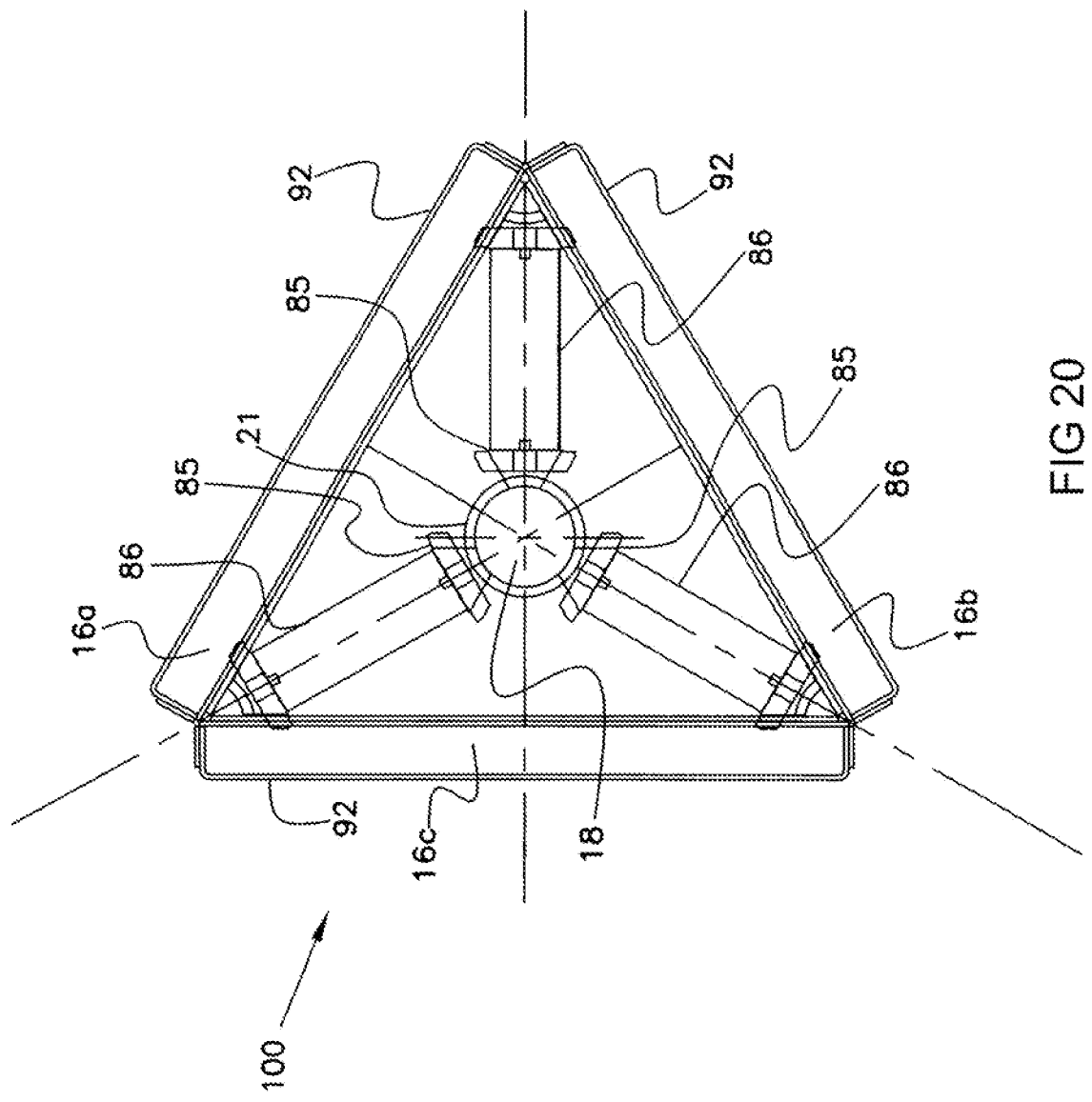

EXTENDABLE/RETRACTABLE SUPPORT COLUMN

CROSS-REFERENCE TO RELATED APPLICATIONS

This application is a continuation of U.S. application Ser. No. 12/537,948, filed Aug. 7, 2009, which is a continuation of U.S. application Ser. No. 12/033,225, filed Feb. 19, 2008, Abandoned, which is a continuation of U.S. application Ser. No. 10/826,867, filed Apr. 16, 2004, now U.S. Pat. No. 7,357,365, issued Apr. 15, 2008, which claims the benefit of U.S. Provisional Application No. 60/463,480, filed Apr. 17, 2003, all of which are incorporated by reference in their entirety.

FIELD OF THE INVENTION

The present invention relates generally to a support column and more specifically to an improved extendable/retractable column for use in supporting elevated structures that can be extended from a portable or fixed platform or other substrate.

DESCRIPTION OF THE PRIOR ART

Structures that comprise one or more elements that can be linked together to form a rigid column or other structure are well known in the art. Structures of this kind may be used to form an elevated or elevatable platform to elevate a person or equipment or to support other structures relative to a supporting substrate or platform. See U.S. Pat. Nos. 2,661,082; 3,397,546; 4,024,595; 4,089,147; 4,237,662; 4,920,710 and 6,112,474.

Extendable/retractable towers (or simply "retractable towers" as they may be referred to herein) of this kind may be further utilized as portable telecommunications towers where various sites can be tested without constructing a costly, permanent test tower. Retractable towers may also be used as supports for temporary lighting systems for sporting events, emergencies, on ships or the like. In general, retractable columns or towers may be used for any application where it is desired to provide a support for a person or equipment at an elevated location relative to a reference platform or substrate.

Retractable towers or columns of the general type to which the present invention relates are shown and described in U.S. Pat. Nos. 4,920,710 and 6,112,474. In general, these patents disclose a retractable column formed from three link chains or three flexible webs. These chains or webs are linked with one another as they are vertically extended to form a tower with a generally triangular cross-section. In these patents, the three link chains or three flexible webs are each stored on a rotatable take-up mechanism located at or near the level of the platform or other supporting substrate. During operation, each of these three link chains or flexible webs is centrally directed so that the link chains and the flexible webs are connected with one another and driven vertically. Accordingly, each of the retractable columns in these patents also includes means for interconnecting the three link chains or flexible webs together and means for driving those elements vertically upwardly.

In U.S. Pat. No. 4,920,710, the interconnection means includes the provision of hook members extending laterally outwardly from corners of each chain member for interconnection with corresponding outwardly extending hook members of an adjacent chain member. In U.S. Pat. No. 6,112,474, this interconnection means is in the form of a set of teeth located along opposite edges of the webs with each of the teeth having a neck and a crown region larger than the neck.

The drive mechanism in U.S. Pat. No. 4,920,710 includes a plurality of rotatable tooth gears positioned within the triangular column which engage corresponding toothed racks on at least two of the chain members. These toothed gears are rotatable about a horizontal axis. In U.S. Pat. No. 6,112,474, the drive means includes a drive roller associated with each of the flexible webs. Each of these drive rollers is rotatable about a horizontal axis and is located outside the generally triangular column. Each roller engages a series of spaced openings in each of the continuous webs.

Although prior retractable columns have been satisfactory for some applications, significant limitations exist due to the nature of the drive mechanisms, the means for providing stability to the column during and after erection, the means for vertically supporting the columns and the complexity of the structures, among others. Accordingly, there is a need in the art for an improved extendable and retractable tower or column structure that overcomes these limitations.

SUMMARY

The present invention relates to an extendable/retractable column including at least three linked sections, each linked section including a plurality of individual sections pivotally connected to one another in end-to-end relationship, and each linked section positioned adjacent to at least two other linked sections. Each individual section includes an inner surface, a first end and a second end and a connection tab at the first end of the individual section. The connection tab extends inwardly of the inner surface of the individual section. Each individual section also includes a tab receiving surface at the second end of the individual section. The tab receiving surface engages the connection tab of an individual section of one of the adjacent linked sections.

The present invention further relates to an extendable/retractable column including a plurality of linked sections and a plurality of drive slots in at least one of said linked sections. The column also includes a linear drive member rotatable about an axis generally parallel to the column. The linear drive member includes a power screw configured to engage the drive slots. Rotation of the power screw of the linear drive member extends or retracts at least one of the linked sections and the plurality of linked sections engage each other to form the column as the linked sections are extended. The plurality of linked sections disengage from each other as the linked sections are retracted.

The present invention also relates to an extendable/retractable column including a plurality of linked sections each comprised of a plurality of individual sections pivotally connected to one another in end-to-end relationship. Each of the individual sections includes a first and second end and a pair of opposing sides. Each individual section includes a plurality of projections extending outwardly from each of its sides. The projections of a first individual section of a first linked section engage the projections of a second individual section of a second linked section when the first and second linked sections are interconnected with one another to form the column.

The present invention relates still further to an extendable/retractable column including a plurality of linked sections each comprised of a plurality of individual sections pivotally connected to one another in end-to-end relationship. Each individual section is a one-piece integral structural unit.

These and other features and objects of the present invention will be more fully described below with reference to the accompanying drawings.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 6 is a view, partially in section, showing the relationship between the drive mechanism, a portion of the outer ring assembly and the linked sections as the linked sections are being driven.

FIG. 7 is a side elevational, schematic illustration showing the manner in which the linked sections are centrally fed and vertically driven.

FIG. 20 is a top view of a central portion of an alternative embodiment of an extendable/retractable column according to the present invention, having a central power screw for extending and retracting the tower.

DESCRIPTION OF THE PREFERRED EMBODIMENT AND METHOD

Reference will now be made in detail to exemplary aspects of the present invention which are illustrated in the accompanying drawings. Wherever possible, the same reference numbers will be used throughout the drawings to refer to the same or like parts.

The present invention relates to an extendable/retractable support column or tower and method for forming the same. The support column in accordance with the present invention is of the type which includes three or more (but preferably three) linked sections which are stored in wrapped form on a rotatable take-up or delivery mechanism at the base of the structure. In this type of extendable/retractable column, each of the linked sections is fed centrally where it engages and is interconnected with an adjacent linked section. These interconnected linked sections are then driven vertically upwardly to extend the column or driven vertically downwardly to retract the column. When the column is erected, the three interconnected linked sections form a column having a triangular cross-sectional configuration.

In the present invention, each of the linked sections is comprised of a plurality of individual sections which are linked together, or pivotally connected with one another, in end-to-end relationship. Throughout the application, various directional and positional references will be used such as upper, lower, inner, outer, etc. When used, these will generally refer to orientation of the individual sections or the linked sections in their position within an erected column. For example, the "upper" direction will be the direction toward the upper end of an erected column, while the "lower" direction will be the direction toward the lower end of an erected column. Similarly, the "inner" direction will be the direction which faces inwardly within the column, while the direction "outwardly" will be the direction which faces outwardly from the column.

Figure 1:
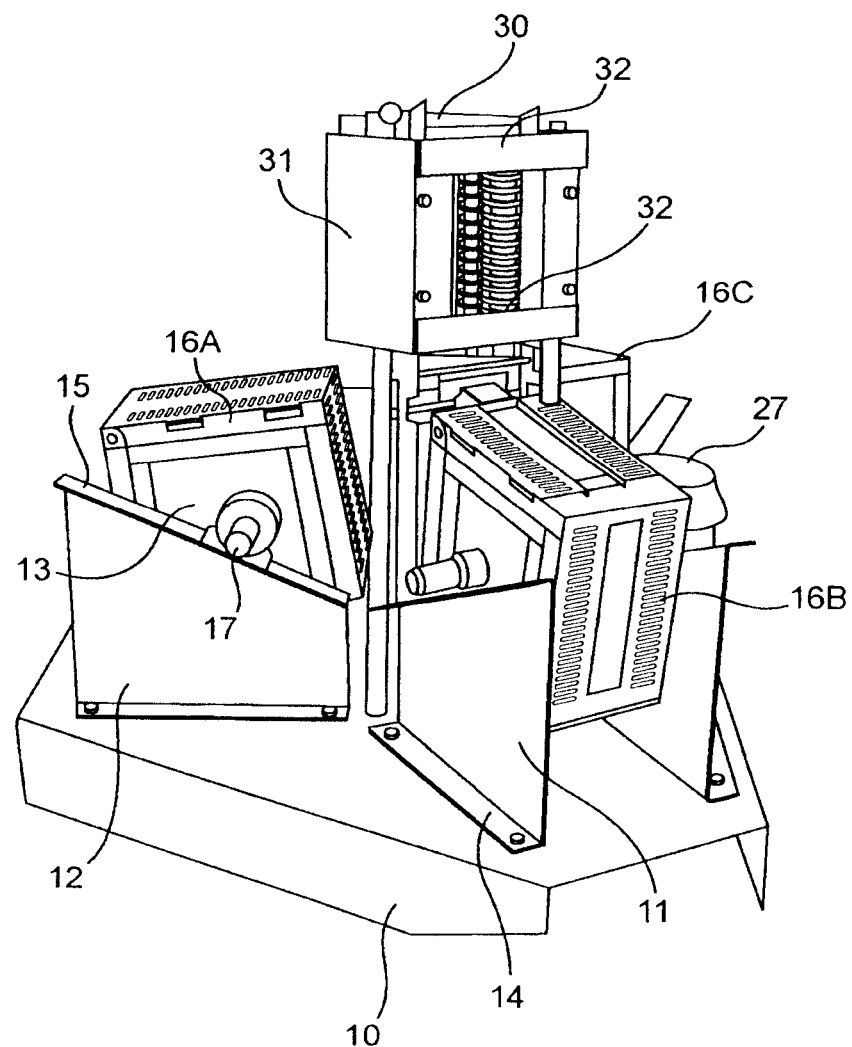
FIG. 1 is an isometric view of the base of the retractable column of the present invention showing the linked sections in their fully retracted form.
Figure 3:
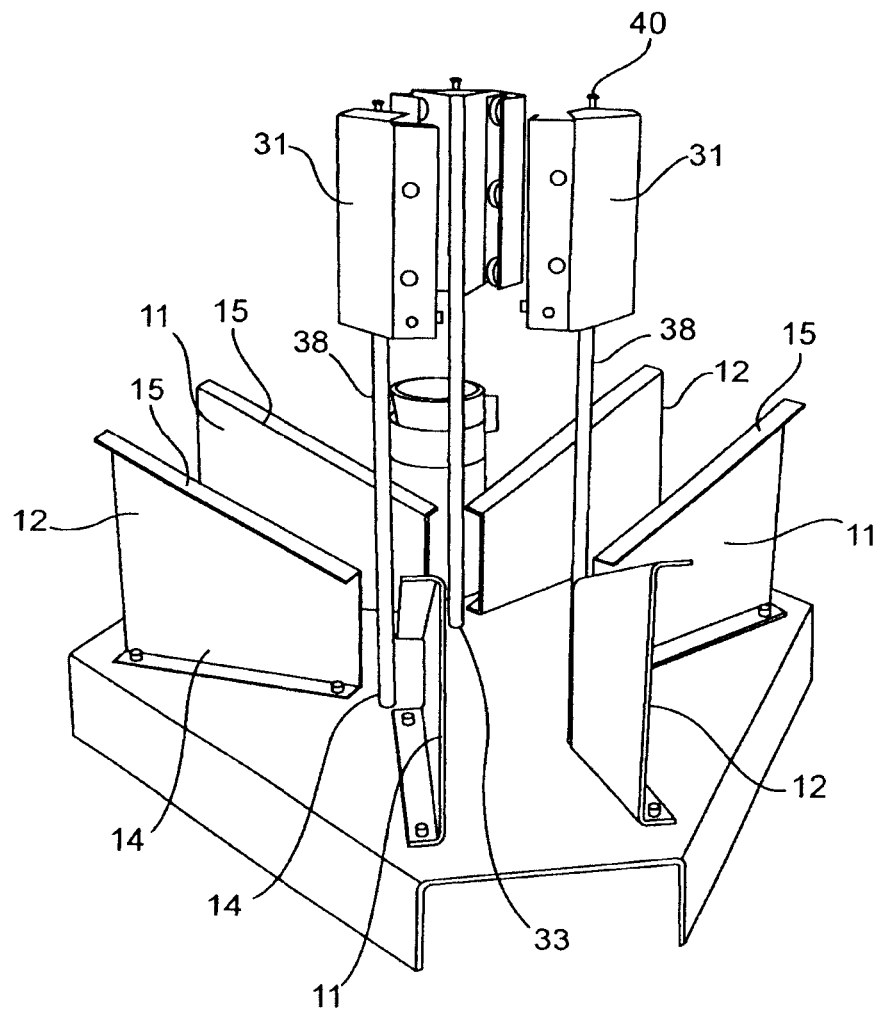
FIG. 3 is an isometric view of the base of the structure of the present invention with the drive mechanism and the three linked sections removed.

With the above general description of the extendable/retractable column of the present invention, the detailed and preferred structure is described with reference to the drawings. With reference first to FIGS. 1 and 3, the column includes a base 10 and three take-up and delivery support frames. Each of these support frames is comprised of a pair of laterally spaced, substantially parallel, frame members 11 and 12. Each of the frame members 11 and 12 includes a base flange 14 for connection to the base 10 and a top flange 15 to rotatably support a take-up and delivery mechanism shaft 17 (FIG. 1). As shown, the three support frames are equally circumferentially spaced relative to the center of the base 10 and each of the top flanges 15 slopes downwardly toward the center of the base 10.

Figure 1A:
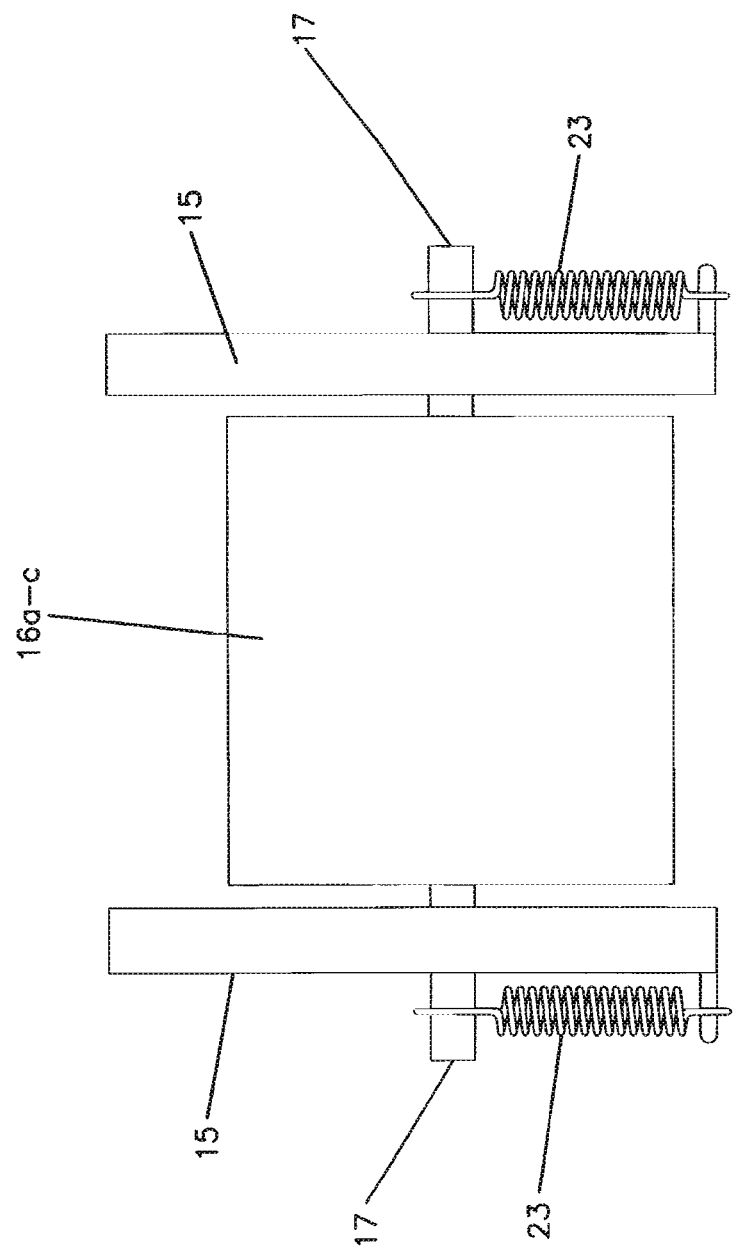
FIG. 1a is an elevational top view showing the springs for biasing the bale of wound linked sections inwardly.

As shown best in FIG. 1, each of the take-up and delivery support frames supports a linked section 16a, 16b and 16c. Each of these linked sections 16a-c is wound or wrapped around a center shaft 17 and a center support 13. The ends of the shaft 17 are rollingly supported by the upper flanges 15. As the individual sections from the linked sections 16a, 16b and 16c are fed from their respective take-up mechanisms, the shafts 17 roll down the inclined flange 15 toward the center. Accordingly, the weight of the rolled up linked sections 16a-c exerts a component inward force on the shaft 17, thereby biasing the entire rolled up bundle or bale of linked sections toward the center If needed or desired, additional bias forces can be applied to the shaft 17 through the utilization of various types of spring members including coil springs, torsion springs and the like to bias the shaft 17 and thus the entire bale of linked sections 16*a-c* toward the center. FIG. 1*a* shows a coil spring 23 pulling or biasing the bale of linked sections 16*a-c* toward the center. The spring 23 has one end connected with the shaft 17 and the other end connected with a portion of the roller support frame near its inner end.

Figure 2:
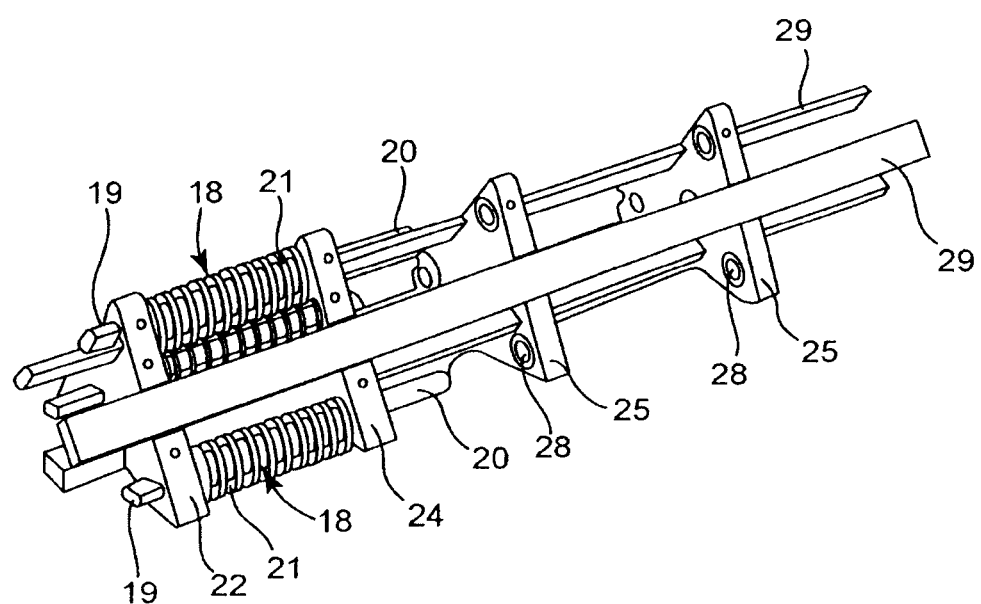
FIG. 2 is an isometric view of a portion of the linear drive mechanism usable in the present invention.

With general reference to FIG. 1 and more specific reference to FIG. 2, a linear drive mechanism is mounted to the base 10 at the center of the base and take-up and delivery mechanisms. The drive mechanism, which is best shown in FIG. 2, includes three linear drive members 18. When assembled and connected with the base 10, the drive members 18 are rotatable about an axis which is generally parallel to the erected tower. Each member 18 includes a continuous spiral or helical drive rib 21 extending throughout its length. Each drive member 18 also includes an upper axial shaft portion 19 and a lower axial shaft portion 20. These shaft portions 19 and 20 rotatably mount the drive mechanisms 18 within the triangular mounting blocks 22 and 24. A further pair of triangular mounting blocks 25,25 are spaced from the lower mounting block 24 and include openings through which a drive shaft can extend to rotate or drive the lower shaft portions 20 and thus the linear drives 18. Such a drive shaft (not shown) extends upwardly through the shaft openings 28 in the blocks 25 to drive the shafts 20. The other ends of the drive shafts in turn extend through holes 33 (FIG. 3) in the floor of the base where they are connected to the output shaft of a drive motor 27 (FIGS. 1 and 3). The drive shafts extending through the floor of the base are connected to the motor output shaft by a chain and plurality of gears. These may be mounted within the base 10.

Preferably, each of the triangular mounting blocks 22, 24 and 25 is provided with a stabilizing notch on each of its sides to receive a stabilizing or spacing bar 29. In the preferred embodiment, the bars 29 are then connected to each of the blocks 22, 24 and 25 by countersunk screws or the like and the lower ends of each of the bars 29 (the ends opposite the linear drives 18) are connected to the base 10 via a plurality of threaded connectors or other means. In the preferred embodiment, a top triangular mount 30 (FIGS. 1 and 5) is provided at the upper end of the bars 29 and is connected to the bars by set screws.

Figure 4:
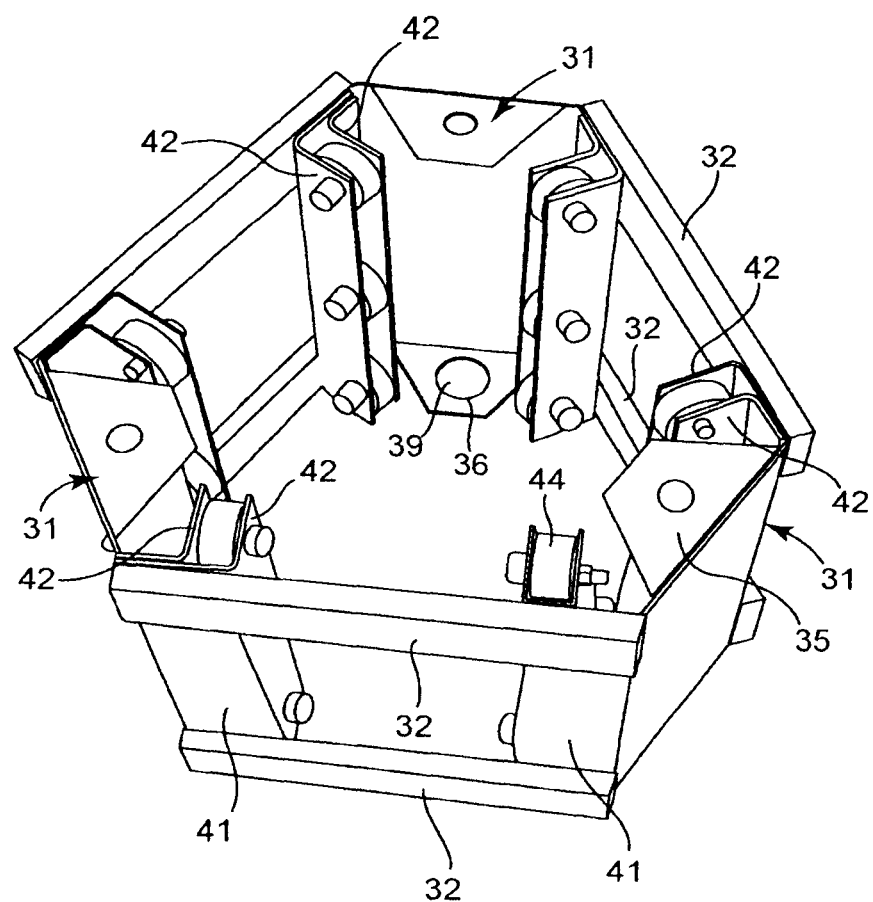
FIG. 4 is an isometric view of the outer stabilizing or constraining ring.
Figure 5:
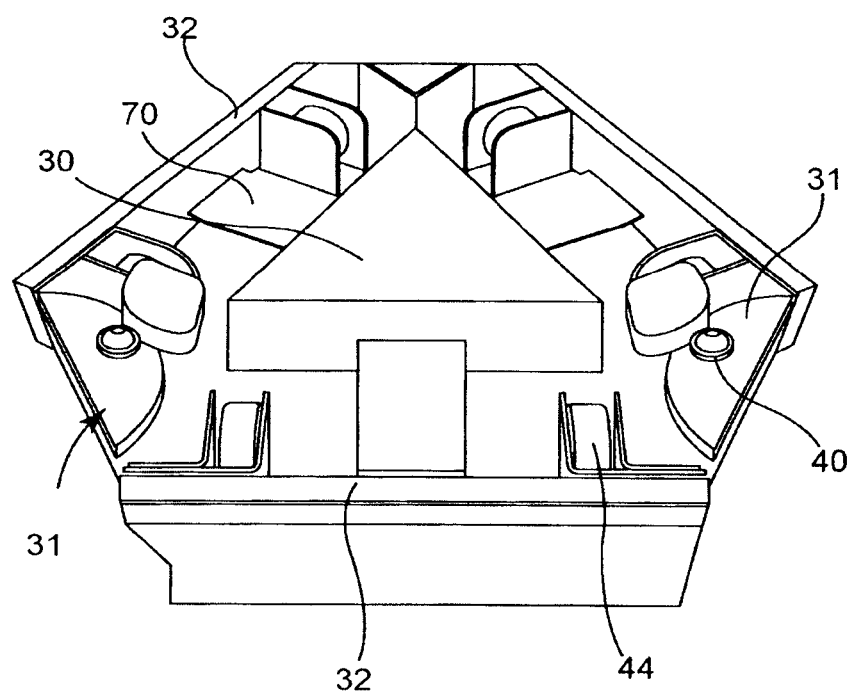
FIG. 5 is an isometric view showing the upper portion of the outer ring assembly and the drive mechanism.

With continuing reference to FIG. 3, as well as detailed reference to FIG. 4, the structure of the present invention is provided with an outer retaining or constraining ring assembly which is partially shown in FIG. 3 and more completely shown in FIGS. 4 and 5. The outer ring assembly includes three roller support members 31 and three pairs of brace members 32,32. An upper brace member 32 is connected with adjacent roller supports 31 near the upper end of the supports 31, while a lower brace member 32 interconnects adjacent roller supports 31 near the lower end of the supports 31. The brace members 32 interconnect the three roller supports 31 into a rigid structure having a generally open interior.

Each of the roller supports 31 includes an outer, planar surface which, when the outer ring is installed, extends in an axial direction generally parallel to the erected column. An upper flange 35 and a lower flange 36 extend radially inwardly from the upper and lower edges, respectively, of the outer wall 34. Each of these flanges 35 and 36 is provided with a generally circular opening to receive a support post 38 (FIGS. 1 and 3). Specifically, each of the support posts 38 extends upwardly through the opening 39 in a corresponding lower flange 36 and is secured to the corresponding upper flange 35 by a threaded member 40 (FIGS. 3 and 5) or other similar means.

With continuing reference to FIGS. 3, 4 and 5, a pair of side flanges 41 extend outwardly from the side edges of each of the outer walls 34. These side flanges 41 form or are joined with a pair of spaced roller support flanges 42,42 to rotatably support a plurality of rollers 44. In the preferred embodiment, each of the rollers 44 is rotatably supported on a pin or other shaft member extending between the roller support members 42, 42. As shown, each of the pair of flanges 42,42 rotatably supports three rollers. Thus, when assembled as shown in FIG. 4, the three roller support members 31 support a total of eighteen rollers. As will be described in greater detail below, this outer ring structure and the plurality of rollers 44 function to constrain and guide the movement of the interconnected column as it is driven upwardly.

Because the outer ring shown in FIG. 4 is supported on the ends of the elongated posts 38, the outer ring "floats" to some extent. In other words, it is capable of minimal movement to accommodate small movements of the column as it is driven vertically.

Figure 8:
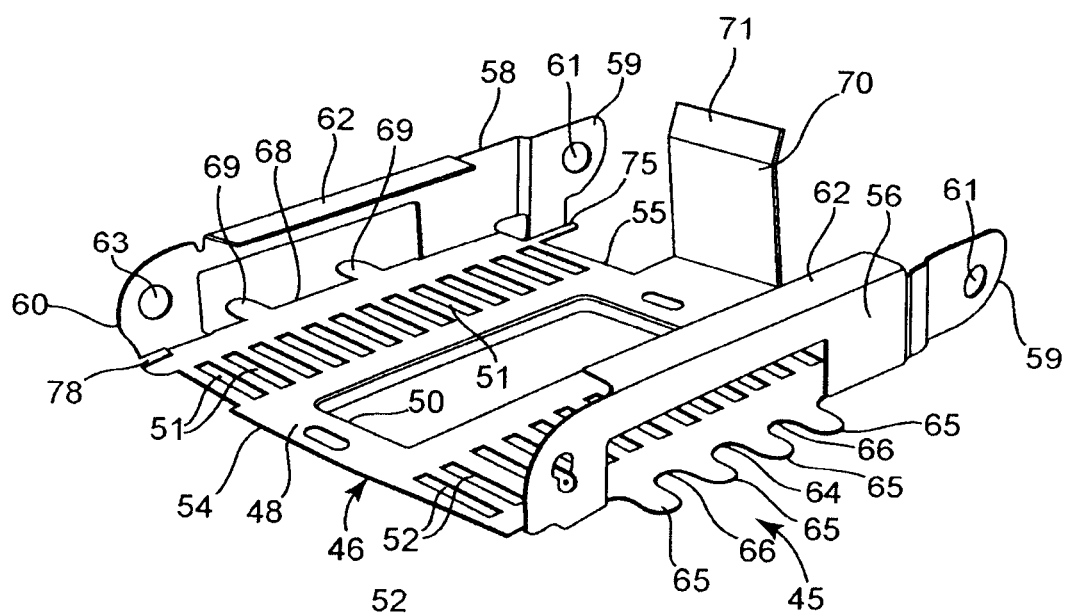
FIG. 8 is an isometric view of one of the individual sections as viewed from the lower, outer corner.
Figure 9:
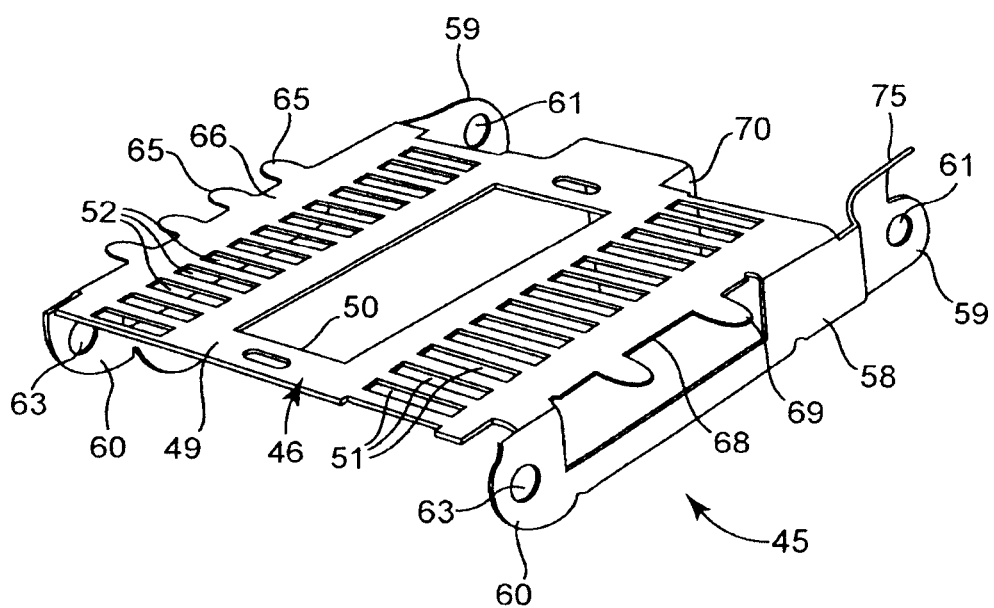
FIG. 9 is an isometric view of one of the individual sections as viewed from the lower, inner corner.
Figure 10:
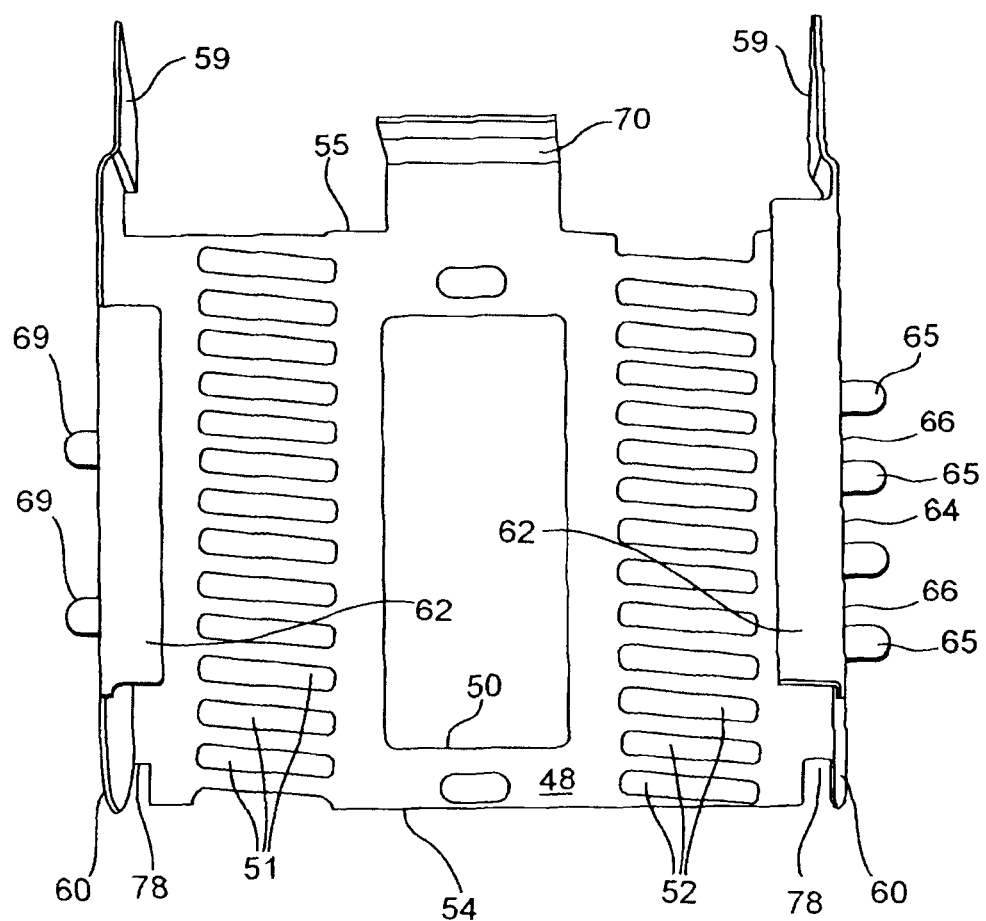
FIG. 10 is an elevational view as viewed from the outer side of an individual section.
Figure 11:
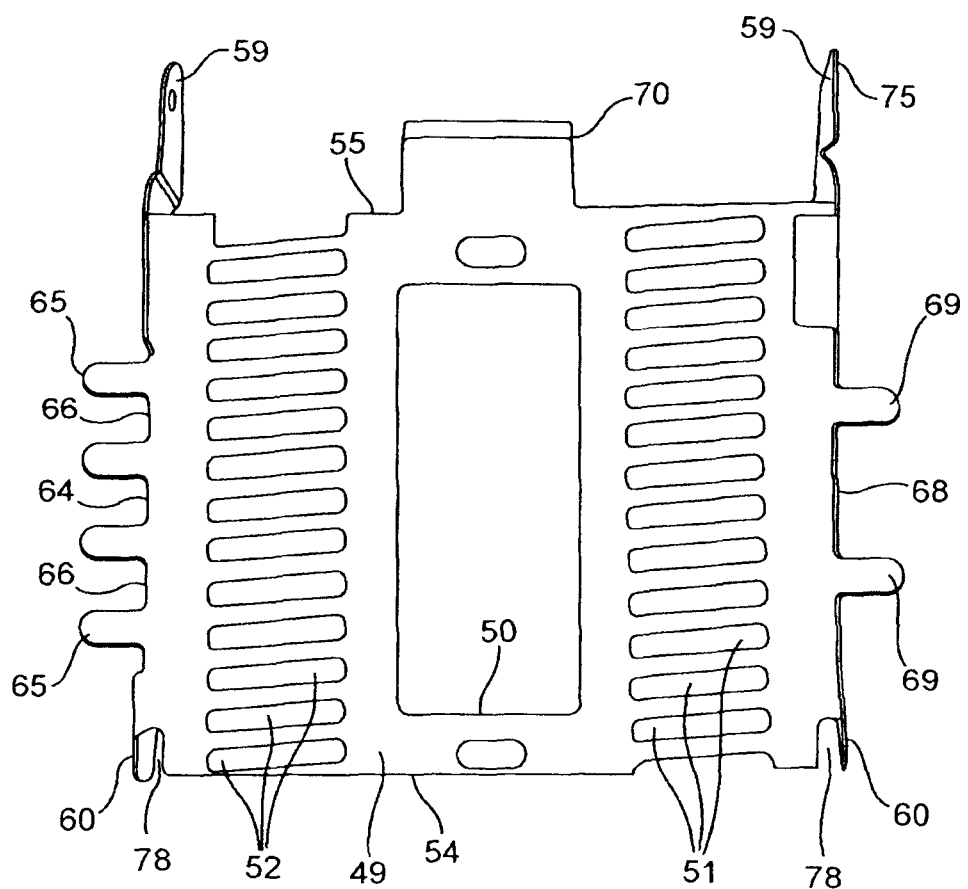
FIG. 11 is an elevational view as viewed from the inner side of an individual section.

Having described the take-up and delivery mechanism, the internal drive mechanism and the outer ring assembly, the linked sections 16*a*, 16*b* and 16*c*, and in particular the individual sections which are vertically connected to one another and make up the linked sections will be described in detail. In describing the individual sections, general reference is made to FIGS. 8, 9, 10 and 11. Each of the individual sections 45 includes a center section shown by the general reference character 46. The center section 46 includes an outer surface 48 shown in FIGS. 8 and 10 and an inner surface 49 shown in FIGS. 9 and 11. The center section 46 includes a lower edge 54, an upper edge 55, a pair of side edges 64 and 68, a center opening 50 and a set or series of linear drive openings or slots 51 and 52 positioned laterally on each side of the center opening 50. As shown, each of the openings in the sets 51 and 52 is sloped relative to the side edges and general vertical orientation of the center section 46. The sets 51 and 52 comprise a plurality of spaced, substantially parallel openings extending from the bottom edge 54 to the top edge 55. The dimensions and the slope of the openings 51 and 52 are designed to accommodate the dimensions and slope or pitch of the spiral drive rib of the linear drive 18 shown in FIG. 2. Thus, the width of the openings 51 and 52 as measured in the vertical direction (from the edge 54 to the edge 55) approximates or is slightly larger than the thickness of the drive rib 21 on the linear drive 18 and the distance between the openings 51 and 52 approximates or is slightly smaller than the distance between the spiral rib 21. Similarly, the slope of the individual openings 51 and 52 approximates the pitch of the drive rib 21.

With this structure, the drive rib 21 of each of the linear drives 18 engages the drive openings 51 and 52 to drive the interconnected linked sections vertically. This is shown best in FIG. 6. As shown, the sections of each of the linked sections 16*a*, 16*b*, 16*c* are interconnected to form a column with a generally triangular cross section. When the interconnected linked sections 16*a*, 16*b* and 16*c* are positioned within the area of the linear drives 18 as shown in FIG. 6, the continuous spiral drive rib 21 of each of the linear drives 18 extends through a plurality of the openings 51 and 52 to drive the assembled column vertically. As shown, the drive rib 21 of each of the linear drives 18 engages the openings 51 and 52 of laterally adjacent sections. Thus, each linear drive 18 will engage the drive openings 51 of one section as well as the drive openings 52 of a laterally adjacent section. When the drives 18 are rotated in one direction, the column will be extended, while rotation of the drives 18 in the opposite direction will cause the column to retract. To facilitate this drive mechanism, the openings 51 must be equally spaced from one another in the vertical direction and the openings 51 in vertically adjacent sections must be spaced from one another so that such equal spacing is continued. The same is true for the openings 52. A feature of the drive of the present invention is that the drive member is rotatable about an axis generally parallel to the axis of the column and that a single drive member is capable of driving laterally adjacent sections of a pair of linked sections.

A first flange 56 extends outwardly at substantially right angles from one side edge of the center portion 46 and a second flange 58 extends outwardly at substantially right angles from the opposite side edge of the central portion 46. The side flange 56 includes an upper pivot support tab 59 and a lower pivot support tab 60. Each of the tabs 59 and 60 includes a pivot opening 61 and 63, respectively. The outermost edge of the side flange 56 is provided with a laterally extending roller guide or engagement flange 62. As shown, the roller engagement flange 62 extends laterally toward the flange 58 at approximately right angles from the side flange 56 and substantially parallel to the center section 46.

Similar to the side flange 56, the side flange 58 includes an upper pivot support tab 59 and a lower pivot support tab 60. Each of these tabs 59 and 60 is provided with a pivot opening 61 and 63, respectively. The outermost edge of the side flange 58 is also provided with a laterally extending roller guide flange 62 which extends laterally toward the flange 56 at approximately right angles from the side flange 58 and substantially parallel to the center section 46.

As shown best in FIG. 6, the roller guide flanges 62,62 of the side flanges 56 and 58 are engaged by the plurality of rollers 44 as the linked sections 16a, 16b and 16c are driven vertically upwardly or retracted downwardly. As shown in FIG. 6, one of the sets of rollers 44 of each of the roller supports 31 engages the roller guide flange 62 of one of the sections, while the other set of rollers of such roller support engages the roller guide flange 62 of a laterally adjacent section.

Figure 15:
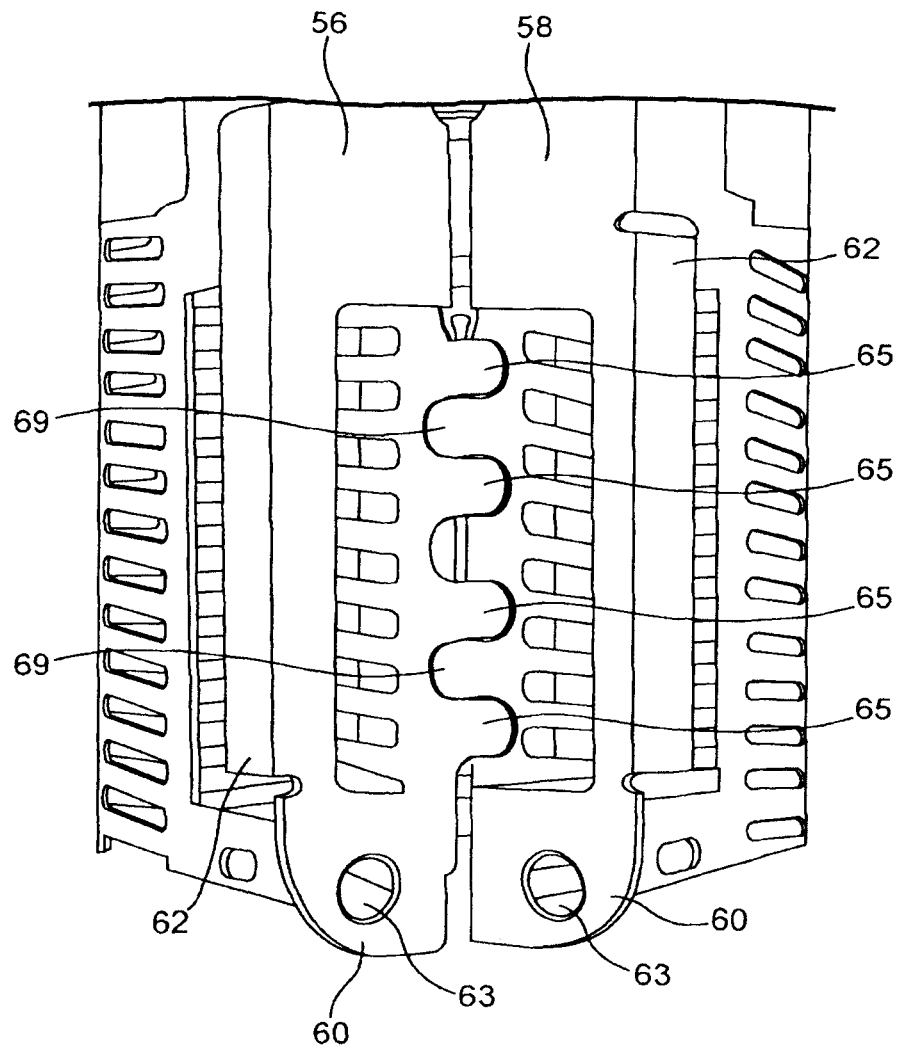
FIG. 15 is an isometric view showing the details of the positioned relationship between the shear tabs of laterally adjacent sections.

Each of the side edges 64 and 68 of the center section 46 is provided with a plurality of vertical support members in the form of shear tabs or shear members. Specifically, the side edge 64 is provided with a plurality of laterally extending shear tabs 65. These shear tabs 65 are vertically spaced along the side edge 64 and are provided with openings 66 between them. The opposite side edge 68 is also provided with a plurality of shear tabs 69. These tabs 69 are also vertically spaced along the side edge 68. In the preferred embodiment, the dimension of the tabs 69 as measured in the vertical direction approximates the dimension of the openings 66 as measured in the vertical direction. Further, the vertical position of each of the tabs 69 along the side edge 68 substantially matches the vertical position of a corresponding opening 66 along the side edge 64. Thus, when the column is assembled with adjacent linked sections engaged with one another, the tabs 65 and 69 will mesh with one another as shown best in FIG. 15 to provide vertical support for the individual sections and to distribute the vertical load.

Although the preferred embodiment shows four tabs 65 on the side edge 64 and two tabs 69 on the opposite side edge 68, any number of cooperating tabs may be provided as long as the tabs on the respective side edges 64 and 68 are positioned so that they have engaging edges. Such engaging edges assist in vertically supporting the column and the load on the column. These shear tabs also function to better distribute the vertical load on the individual sections along the length of the side edges 64 and 68, between the upper and lower edges 54 and 55. In general, several cooperating tabs with engaging surfaces will better distribute the load vertically than a single pair of cooperating tabs with engaging surfaces. Further, although the preferred embodiment shows the load distribution elements as a plurality of shear tabs, these distribution elements can take the form of alternate structures such as cooperating pins or other projections along the side edges of the individual sections which have cooperating or engaging surfaces.

Figure 16:
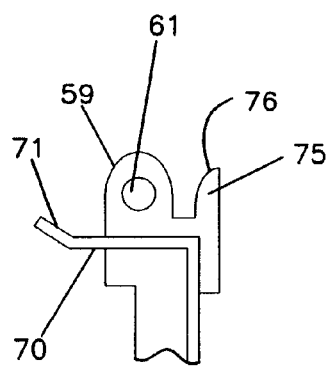
FIG. 16 is a view, partially in section, as viewed along the section line 16-16 of FIG. 10.
Figure 19:
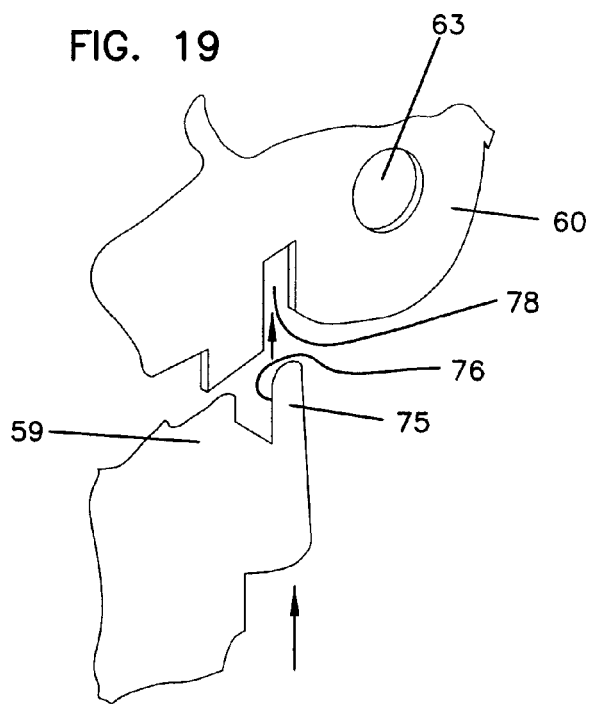
FIG. 19 is an enlarged, fragmentary view showing the connection between the connecting tab on one section with the receiving recess on a vertically adjacent section of an adjacent linked section.
Figure 17:
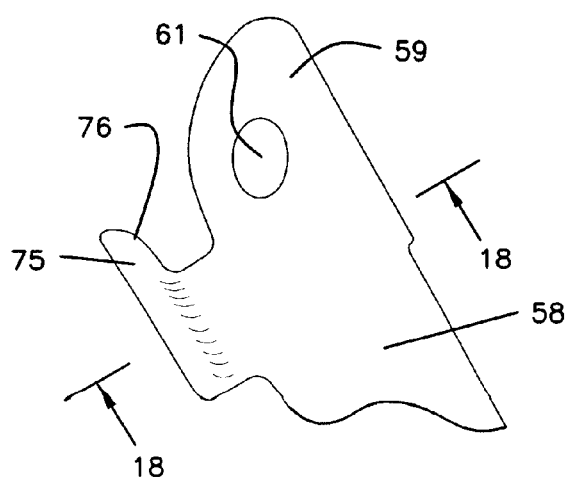
FIG. 17 is an enlarged, fragmentary view of one of the pivot support tabs showing the upwardly extending connection member.

Each of the individual sections 45 also includes a section retaining tab 70. As shown best in FIGS. 8 and 16, the tab 70 extends outwardly from a portion of the upper edge 55 of the center section 46 and includes an outer, distal end 71 which is bent upwardly. This retaining tab is sometimes referred to as a retaining bill or a "duck bill" and functions to keep the rolled bales of linked sections 16a, 16b and 16c together during storage and during extension and retraction of the column to prevent the same from unwrapping or unwinding. As shown best in FIG. 16, the tab 70 extends outwardly at about right angles from the upper edge 55 of the central portion 46 at a point just below the openings 61. This enables the distal end 71 of the tab 70 to engage the pivot rod 72 (FIG. 12) of a corresponding section 45 to retain the linked sections in a wound condition within the bale.

Figure 12:
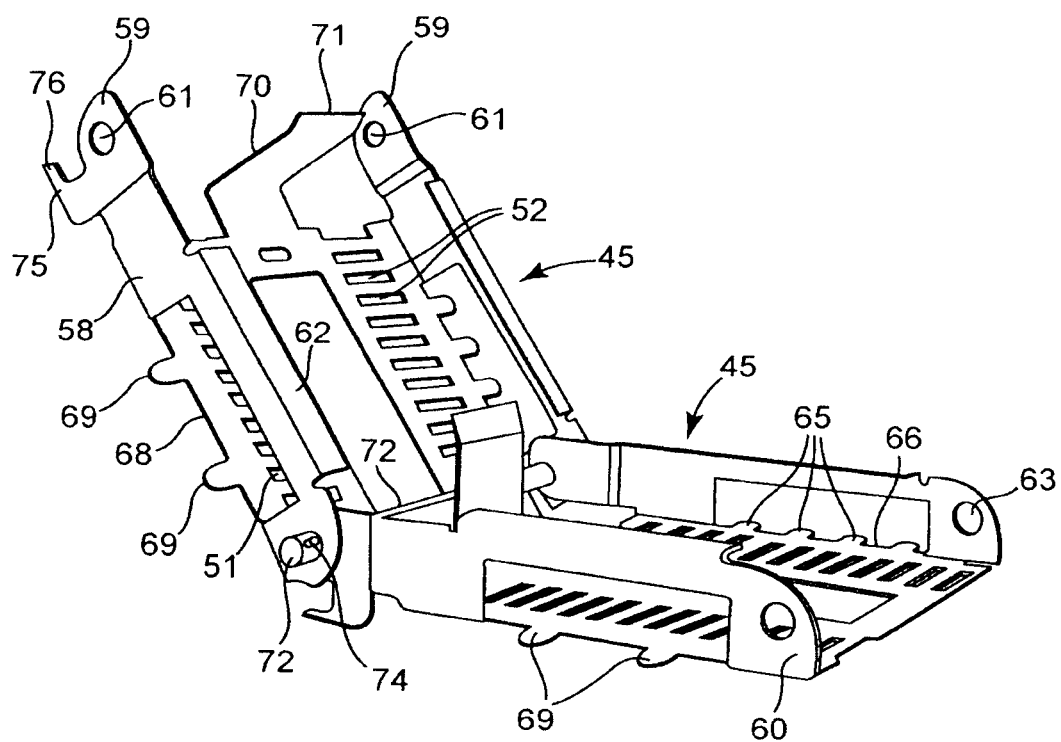
FIG. 12 is an isometric view showing a pair of sections vertically linked together.
Figure 13:
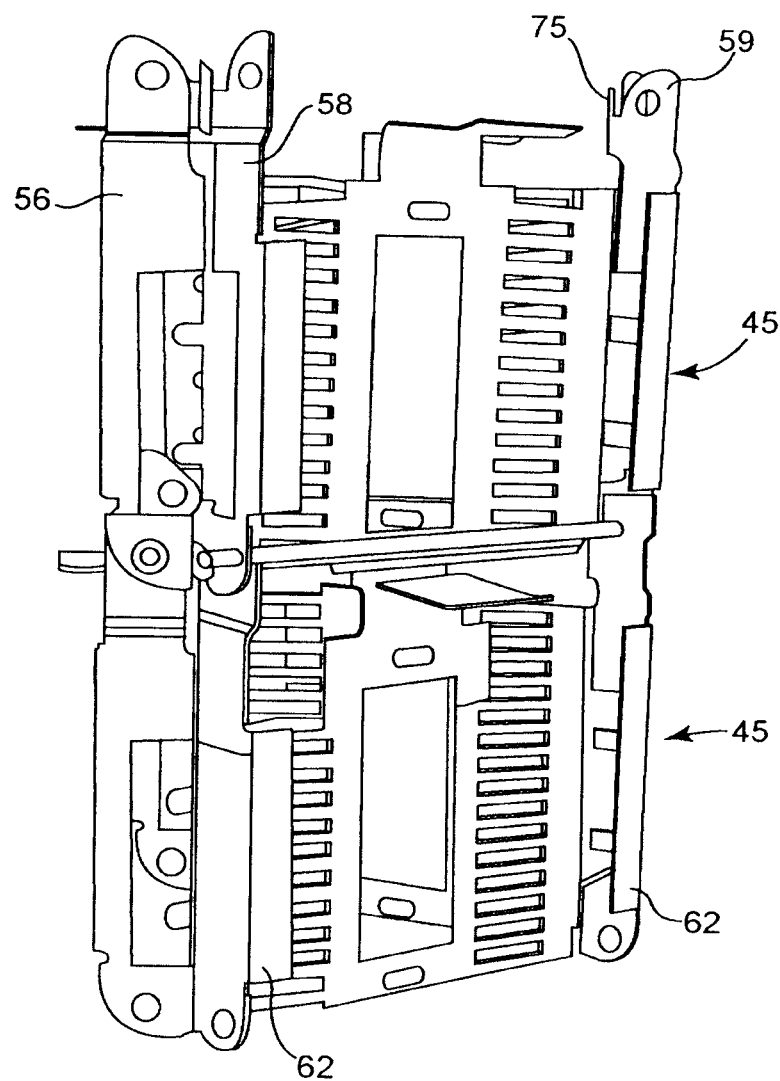
FIG. 13 is an isometric view showing a plurality of the linked sections interconnected to form a partial column.
Figure 14:
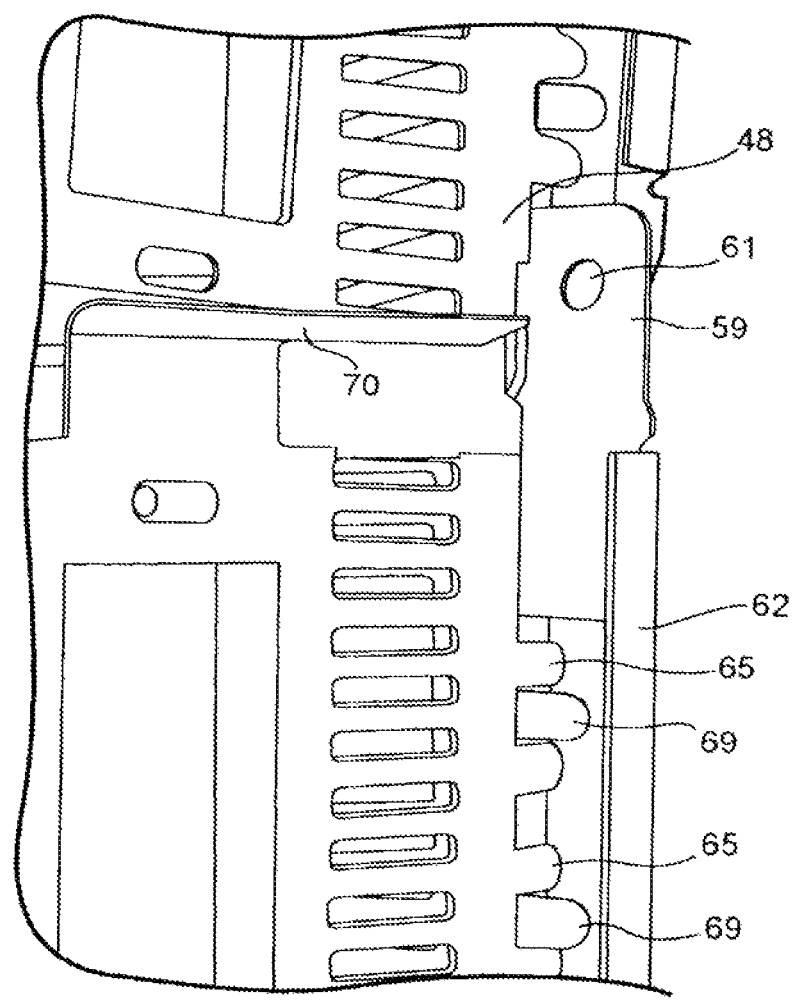
FIG. 14 is an isometric view showing the details of the interconnection between laterally adjacent sections, with the pivot rod removed.

Each of the three linked sections is formed by pivotally connecting a plurality of individual sections 45 in end-to-end relationship in a vertical direction. As shown best in FIG. 12, this is accomplished by a pivot rod 72 which extends through the pivot openings 61 at the upper end of one section 45 and through the pivot openings 63 at the lower end of a vertically adjacent section 45. The pivot rod 72 is retained within the pivot openings 61 and 63 via cotter pins or other retaining members 74 at each end of the rod 72. Although FIG. 12 shows two individual sections 45 pivotally connected to one another by the rod 72, each linked section is comprised of a relatively large number of individual sections 45 each pivotally connected to a vertically adjacent section. In the preferred embodiment, a typical column with the ability of being raised to a height of 20-80 feet or more may have as many as 10-60 or more individual sections 45 pivotally connected to one another in the vertical direction. When these individual sections are pivotally connected with one another to form a linked section, the linked sections are capable of being wound into the form of a bale as shown in FIGS. 1 and 7. The bale is rotatably supported on the shaft 17. Although the preferred embodiment shows the rods 72 spanning the entire width of the sections 45 as providing the pivotal connection, separate pivotal connections such as rivets or the like could be provided at each corner.

Figure 18:
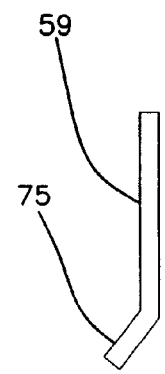
FIG. 18 is a view, partially in section, as viewed along the section line 18-18 of FIG. 17.

With reference to FIGS. 9, 11, 12, 17 and 18, each of the individual sections 45 includes a hook portion or connecting tab 75 which extends upwardly from an inner portion of the pivot support tab 59 connected with the side flange 58. Thus, in the preferred embodiment, the hook or connecting tab 75 is located at the top of each of the individual sections 45 and extends upwardly for engagement with an individual section in an adjacent linked section. As shown best in FIGS. 17 and 18, the connecting tab extends upwardly from a portion of the inner edge of the pivot support tab 59 and includes a beveled or lead-in surface 76. As shown in FIG. 18, the tab 75 is bent or beveled laterally outwardly from the plane of the pivot support tab 59. This enables the connecting tab 75 to engage and interconnect with a corresponding section in an adjacent linked section.

Each of the individual sections 45 also includes a connection tab receiving recess 78 formed at the laterally outer, lower edge of the central portion 46 and adjacent to the pivot support tabs 60 at the lower ends of each of the individual sections 45. As shown best in FIGS. 8 and 9, these recesses 78 extend upwardly to a point generally in the area of the pivot openings 63 in the tabs 60. During erection of the column, these recesses receive a connection tab 75 from a corresponding section to connect adjacent linked sections to one another as the column is erected.

As shown, the tab 75 extends inwardly relative to the inner surface 49 of the center section 46 and extends upwardly relative to the upper edge 55 of the section 45. Although the preferred embodiment shows the tabs 75 located at the upper end and extending upwardly in the recesses 78 located at the lower end, these could be reversed, with the tab 75 located at the lower end and extending downwardly and the recesses 78 located at the upper end. In any event, the tab 75 must be of sufficient length so that when the linked sections are erected into a column, it engages an inner surface portion of a corresponding section in a laterally adjacent linked section. With this structure, the interconnection between adjacent linked sections is located on the inside of the erected column. In the present invention, the tabs function to retain the plurality (three) of linked sections laterally, while the shear tabs 65 and 69 function to provide the vertical support and load distribution for the column.

Having described the structural details of the column of the present invention, its operation can be understood best as follows. First, three elongated linked sections are constructed from a plurality of the individual sections 45 such as those shown in FIGS. 8-11. These individual sections are pivotally linked together by the pivot rods 72 extending through the pivot openings 61 and 63 in the tabs 59 and 60 to form the linked sections 16a-c. Two sections 45 linked together are shown in FIG. 12. The number of sections in any one linked section will determine the maximum height to which the column can be extended. In general, as many as 10-60 or more sections 45 can be pivotally linked together to form an individual linked section.

Each linked section 16a-c is then wound onto a bale such as that shown in FIGS. 1 and 7. Each of these bales is rollingly supported on a shaft 17 which rolls against the upper flange surface 15 of the frame members 11 and 12. When in their wrapped or wound position as shown in FIGS. 1 and 7, the retaining tabs 70 engage the pivot rod 72 of an associated section 45 to keep the linked section retained in a wound condition.

To erect the column, the sections 45 from each of the linked sections 16a-c are simultaneously fed inwardly from the bales toward the center and then upwardly to erect the column. This is accomplished by engagement between the linear drive members 18 and the plurality of drive slots 51 and 52 as described above.

As the individual sections 45 of the linked sections 16a-c are fed into the central area, the connection tabs 75 of one section slip into the receiving recesses 78 of a vertically higher section in an adjacent linked section. This retains the linked sections 16a-c in a generally triangular configuration. At the same time, the shear tabs 65 and 69 become meshed with one another to provide and distribute vertical load support. Accordingly, the retaining tabs 75 connect the linked sections together into the form of a column of generally triangular cross-section and the meshing of the shear tabs or shear members 65 and 69 bear the majority of the vertical load.

An alternative embodiment of an extendable and retractable column 100 is illustrated in FIGS. 21 to 23C, including an alternative drive with a power screw 18 centrally located as shown in FIG. 20. Column 100 uses only one power screw 18 versus three power screws 18 as shown in FIG. 6. Column 100 includes three power screw nuts, or linked lug sections 85 which engage both sections 16a, 16b and 16c, as well as power screw 18. These linked lug sections 85 are drawn in a circular fashion (clockwise or counterclockwise) around a path 102 defined about a pulley system 86, by the rotation of power screw 18. As each of the linked lug sections 85 are continuous, each of the linked lug sections defines an infinite length power nut for transferring movement of power screw 18 to the panel sections 16a, 16b and 16c. In the earlier described embodiment, as shown in FIG. 6, the power nuts 51 and 52 were located in the panel sections, items 16a, 16b, and 16c, and each power nut 51 and 52 defines a finite length.

Figure 21A:
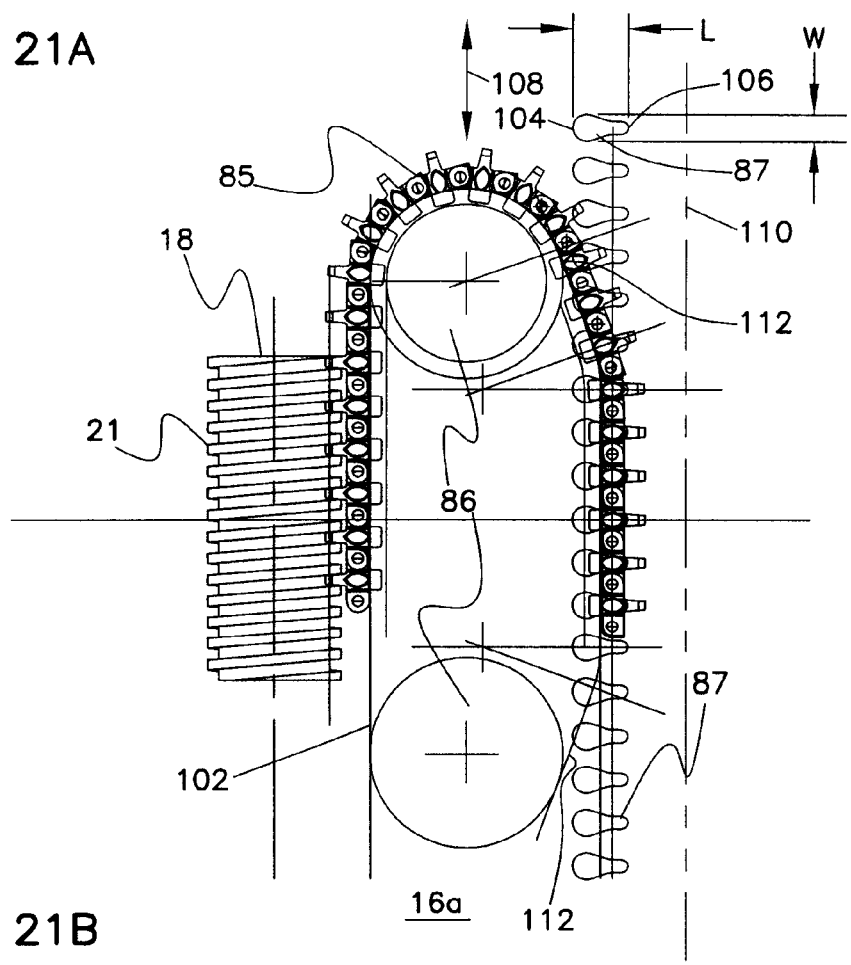
FIG. 21A is a side view of the power screw of FIG. 20, along with an infinite length power nut made of a plurality of lugs, with the lugs engaging openings in an inner face of a section forming a portion of the extendable/retractable column.
Figure 21B:
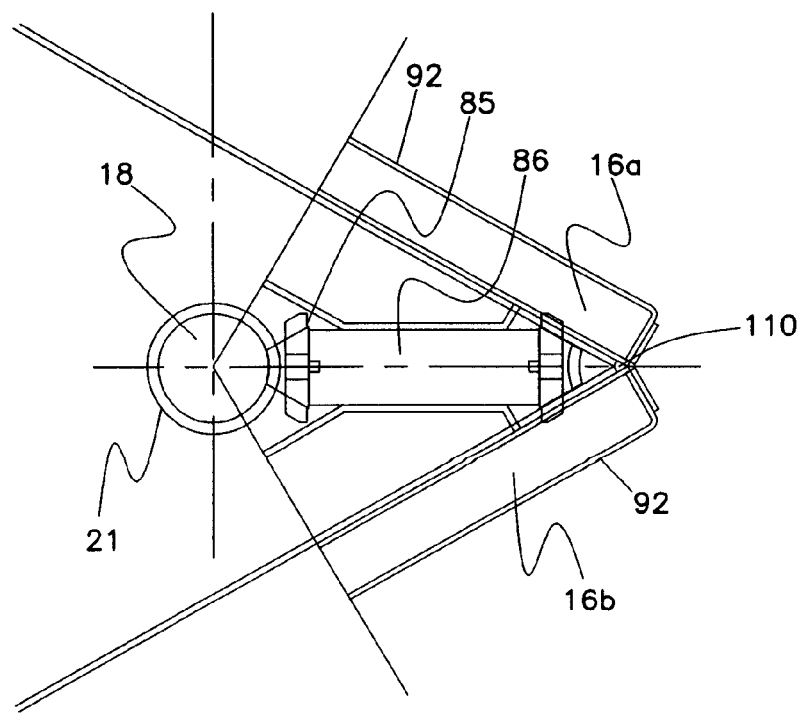
FIG. 21B is a top view of the power screw and power nut of FIG. 21A, with the lugs of the power nut engaging the inner faces of a pair of sections forming a portion of the extendable/ retractable column.
Figure 22A:
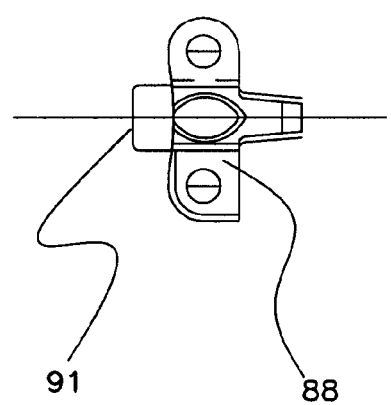
FIG. 22A is a side view of one of the lugs forming the infinite length power nut of FIG. 21A.
Figure 22B:
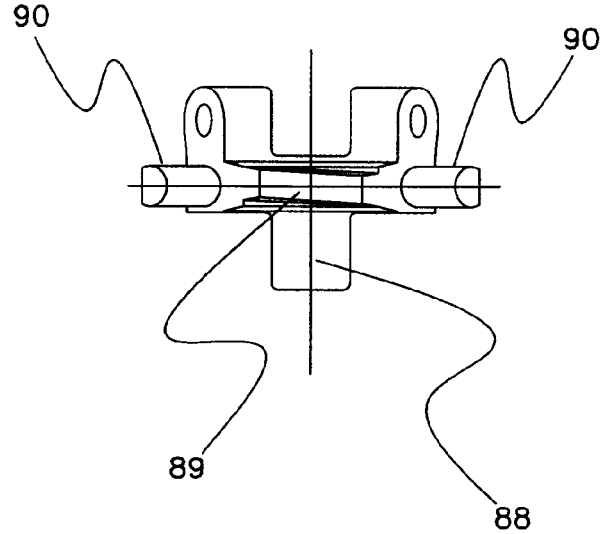
FIG. 22B is a view of the power screw engaging portion of the lug of FIG. 22A.
Figure 22C:
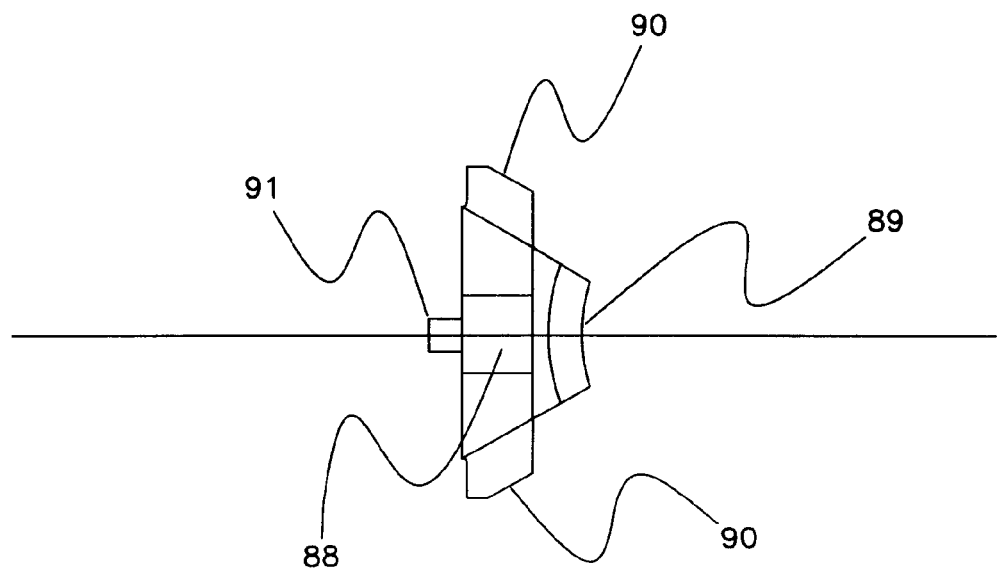
FIG. 22C is a bottom view of the lug of FIG. 22A.

The drive approach depicted in FIGS. 20, 21A and 21B relies on a unique lug 88, shown in FIG. 22. A plurality of lugs 88 may be linked together to form a linked lug section 85, and each lug 88 forms a portion of the infinite length power nut. Each lug 88 may include a portion 89 corresponding to the power screw thread 21 (shown in FIGS. 20, 21A and 21B), a pair of lifting pegs 90, and a guide rail 91. Portion 89 matches thread 21 on power screw 18, to transfer motion and force to the lifting pegs 90. The guide rail 91 on each lug 88 keeps the linked lug sections 85, in the prescribed path 102 and correctly oriented to engage panel sections 16a, 16b and 16c.

FIGS. 21A and 21B depict one of the three linked lug sections 85, being driven by power screw 18. As linked lug section 85 rotates along path 102 around pulley system 86, it makes contact in a plurality of slots or openings 87, which is located in the adjacent panel sections 16a and 16b, to raise or lower the linked panel sections which make up column 100. Each opening 87 in the panel sections 16a defines a length L oriented generally perpendicular to a direction of extension or retraction 108, which is also the direction of movement of linked lug section 85. Each opening 87 further defines a width W generally parallel to direction 108. Opening 87 includes an end portion 104 with a greater width positioned away from a nearest adjacent edge 110 of panel 16a, and an end portion 106 with a narrower width positioned toward edge 110. The shape of opening 87 facilitates the entry and exit of a lifting peg 90 into and out of opening 87 as a lug 88 of linked lug section 85 rotates through one of a pair of angled portions 112 of path 102. Lifting peg 90 would enter or exit opening 87 through wider end portion 104 and transition into narrower end portion 106 to engage and lift or lower panel 16a. The shape of opening 87 facilitates the movement of lifting peg 90 into and out of opening 87 while helping preserve the timing of lift of adjacent panels 16a, 16b and 16c so that tabs 65 and 69 along the edges of the panels properly engage and disengage to form column 100.

While panel sections 16 may vary in width as required for particular applications, at greater widths, it may be desirable to increase the strength or rigidity of each panel 16 to improve the overall strength and rigidity of the tower. External and internal bracing of the tower is not practical due to the retractable nature of the column. Thus, each panel 16 may be include a second component, such as an outer surface 92, as shown in FIGS. 20, 21A and 21B. As shown in these Figures, panel sections 16a, 16b, and 16c, are double walled, having inner surface 49 and outer surface 92. The additional outer surface 92 may be attached by various fastening techniques such as welding, riveting, screwing, etc. This additional outer surface 92 increases the structural inertia to stiffen the panel when appropriate.

Although the description of the preferred embodiment has been quite specific, it is contemplated that various modifications could be made without deviating from the spirit of the The following is claimed:

1. A link for forming an extendable/retractable column having a plurality of linear sections, wherein each linear section is formed by a plurality of links that are pivotally connected to each other by pivot rods in an end-to-end manner, each link comprising:
a generally planar, rigid body having a first end, a second end, a first side, a second side, an outer surface and an inner surface;
wherein the first and second sides each further comprise a side flange with a pivot opening and a roller guide, with each side flange extending outwardly at a substantially right angle with respect to the outer surface of the body, with each pivot opening spaced outwardly with respect to the outer surface of the body, with the pivot openings configured and arranged to receive and retain a pivot rod so that the pivot rod is substantially parallel to the body, and with each roller guide spaced outwardly from the outer surface of the body, with each roller guide extending toward the other roller guide, and with the roller guides in alignment with each other and substantially parallel to the body; and,
a connection tab, the connection tab located at one of the first or second ends of each link, with the connection tab extending inwardly from the inner surface of the body, and with the connection tab configured and arranged to engage a vertically adjacent link.

2. The link of claim 1, wherein the connection tab is located on one of the side flanges.

3. The link of claim 1, wherein the connection tab is adjacent the first end of the body.

4. The link of claim 1, wherein the connection tab includes an upwardly opening slot that is defined by an upper pivot support tab and a lead-in surface.

5. The link of claim 1, with the link further comprising a first group of parallel, elongated slots, with each slot having a length that extends partially between the first and second sides, with each slot having a length that is greater than a distance defined by the inner and outer surfaces of the body, with the slots of the first group of slots in alignment with each other and evenly spaced along a length defined by the first and second ends, and with the first group of parallel slots located adjacent the first side of the body.

6. The link of claim 1, further comprising a retaining tab that extends outwardly relative to the outer surface of the body, with the tab having a portion that extends outwardly beyond the outward extents of the side flanges.

7. The link of claim 1, further comprising a plurality of projections extending away from the first and second sides in a transverse direction, with the projections configured and arranged to engage projections of laterally adjacent links when the links are interconnected with one another to form the column.

8. The link of claim 1, wherein the connection tab extends vertically away from said first or second end of the link.

9. The link of claim 1, further comprising a tab receiving recess, with the tab receiving recess located at an end opposite the end that includes the connection tab.

10. The link of claim 1, wherein each side flange extends substantially from the first end to the second end of the link.

11. A link for forming an extendable/retractable column having a plurality of linear sections, wherein each linear section is formed by a plurality of links that are pivotally connected to each other by pivot rods in an end-to-end manner, each link comprising:
a generally planar, rigid body having a first end, a second end, a first side, a second side, an outer surface, an inner surface and said second end having a bottom edge;
a first group of parallel, elongated slots, with each slot having a length that extends partially between the first and second sides, with each slot having a length that is greater than a distance defined by the inner and outer surfaces of the body, with the slots of the first group of slots in alignment with each other and evenly spaced along a length defined by the first and second ends, and with the first group of parallel slots located adjacent the first side of the body,
wherein the first and second sides each further comprise a side flange with a pivot opening, with each side flange extending outwardly at a substantially right angle with respect to the outer surface of the body, with each pivot opening spaced outwardly with respect to the outer surface of the body, with the pivot openings configured and arranged to receive and retain a pivot rod so that the pivot rod is substantially parallel to the body; and,
a connection tab, the connection tab located at one of the first or second ends of each link, with the connection tab extending inwardly from the inner surface of the body, and with the connection tab configured and arranged to engage a vertically adjacent link.

12. The link of claim 11, with the link further comprising a second group of parallel, elongated slots that are in alignment with each other and evenly spaced along the length defined by the first end and the second end.

13. The link of claim 12, wherein the second group of slots is located adjacent the second side of the body.

14. The link of claim 12, wherein each slot of the second group of slots having a length that extends partially between the first and second sides, and with the length of each slot being greater than a distance defined by the inner and outer surface of the body.

15. The link of claim 7, wherein the plurality of projections is generally coincident with a plane defined by the inner surface of the body.

16. The link of claim 7, wherein the projections of the first side are parallel to the projections of the second side.

17. The link of claim 7, wherein the projections of the first side are vertically offset with respect to the projections of the second side.

18. The link of claim 7, wherein two projections of the first side of the link engage one projection of the second side of a laterally adjacent link when the links are interconnected with one another to form the column.

19. The link of claim 11, wherein each elongated, parallel slot of the first group of slots is oriented at an angle with respect to a bottom edge of the body.

20. The link of claim 12, wherein each elongated, parallel slot of the second group of slots is oriented at an angle with respect to a bottom edge of the body.

* * * * *